United States Patent [19]
Lee

[11] 4,399,840
[45] Aug. 23, 1983

[54] CLOSURE MEMBER

[75] Inventor: Morris M. Lee, 10 Catherine St., Delmar, N.Y. 12054

[73] Assignees: Morris M. Lee; Corina M. Lee, both of Delmar; Walter F. Wessendorf, Jr., Guilderland, all of N.Y.; part interest to each

[21] Appl. No.: 371,928

[22] Filed: Apr. 26, 1982

[51] Int. Cl.³ .............................................. F16L 11/12
[52] U.S. Cl. ...................................... 138/168; 138/99; 138/128; 138/156; 138/103; 138/178; 174/DIG. 8; 428/913
[58] Field of Search ................... 138/99, 128, 151, 156, 138/162, 168, 178, 103; 174/68 C, DIG. 8; 428/36, 192, 913; 24/16 R, 16 PB, 17 AB, 20 W

[56] References Cited

U.S. PATENT DOCUMENTS

| 3,151,767 | 10/1964 | Nakata | 138/168 X |
| 3,379,218 | 4/1968 | Conde | 138/99 |
| 3,455,336 | 7/1969 | Ellis | 138/156 |
| 3,467,761 | 9/1969 | Plummer . | |
| 3,542,077 | 11/1970 | Muchmore | 138/99 |
| 3,574,313 | 4/1971 | Tanaka | 138/99 |
| 3,899,807 | 8/1975 | Sovish et al. | 156/86 X |
| 3,959,052 | 5/1976 | Stanek | 156/86 |
| 3,982,564 | 9/1976 | Clabburn et al. | 174/DIG. 8 |
| 4,135,587 | 1/1979 | Diaz | 174/DIG. 8 |
| 4,219,051 | 8/1980 | D'Haeyer | 138/178 |
| 4,287,011 | 9/1981 | Derbyshire | 174/DIG. 8 |

FOREIGN PATENT DOCUMENTS 1506242 4/1978 United Kingdom .
2054781A 2/1981 United Kingdom .

Primary Examiner—James E. Bryant, III
Attorney, Agent, or Firm—Walter F. Wessendorf, Jr.

[57] ABSTRACT

Disclosed is a closure member for insulating, sealing, waterproofing and otherwise protecting an object from the elements. The closure member is of integral, one-piece construction, is of heat-shrinkable material, has a main body for enveloping the object and easily hand-assembled hooks, formed from material-sandwiched, angled and articulated inserts, interfoldable to define a joint and form thereby an enveloping tubular member. The hooks have on their ends small projections defining detents that are mechanically imbeddable for positive joint closure and seal, while affording a wide range of alignment in the interfolded and sandwiched assembly of the hook.

10 Claims, 5 Drawing Figures

CLOSURE MEMBER

BACKGROUND OF THE INVENTION

1. Technical Field

This invention relates to an elongated closure member for insulating and sealing an object as the spliced joint of electrical, electronic, telecommunications cable or other spliced article. The heat-shrinkable closure member is appropriately disposed to envelop the object. The closure member has integral hooks that are interconnectable to define an interlocking joint to effect positive closure and seal and to define thereby an enveloping tubular member. Upon appropriate application of heat, the material of such closure member shrinks to its original form thereby shrinking upon the enveloped object.

2. Background Art

The prior art, U.S. Pat. No. 3,379,218, disclose a closure sleeve for pipes and the like; U.S. Pat. No. 3,455,336 discloses a heat recoverable article and process; U.S. Pat. No. 3,467,761 discloses an electrically shielded heat-reactive jacket for conductors; U.S. Pat. No. 3,542,077 discloses a differentially cross-linked article and process for making the same; U.S. Pat. No. 3,574,313 discloses a wraparound closure sleeve; U.S. Pat. No. 3,899,807 discloses heat recoverable articles and method of making same; U.S. Pat. No. 3,959,052 discloses a wrap around heat shrinkable article; U.S. Pat. No. 4,135,587 discloses cases for enclosing substrates; U.S. Pat. No. 4,219,051 discloses a heat recoverable article; U.S. Pat. No. 4,287,011 discloses a closure method; British Pat. No. 1,506,242 discloses a fastener device; British Pat. No. 2,054,781 discloses material for wrapping around a pipe, cable or the like.

In comparison to the prior-art closure members, the closure member of this invention incorporates structural features providing the following functional attributes: the joint need not be bonded together; discrete sealing interlock of the joint is not essential; the closure member is of integral, one-piece construction; a wide range of alignment of the joint is possible because joint alignment is not critical; cross-linking or non cross-linking of the encapsulating material at the joint is not essential nor critical; the seal at the joint does not depend upon simultaneous and compatible application of heat, time and pressure; simple filed installation of the closure member can be effected regardless of weather; the sealing of the joint does not depend upon the use of separate adhesive; joint contamination will not cause malfunction of the interlocking joint; the heat-shrinkable material sandwiches therebetween the metal channel inserts to form the hooks that have total weather and corrosion resistance; the foregoing structural features cooperate to make the closure member of this invention an ideal candidate for field installation; the closure member is easily manufactured; and additional heavy equipment or tool(s) are not necessary to effect field installation of the closure member.

Such described functional attributes are solutions to the problems that prior-art closure members have in varying respects from closure member to closure member.

Accordingly, the object of the invention is to contribute to the solution of the recited problems encountered with prior-art closure members by providing a closure member that has structural features that provide the described and delineated functional attributes.

SUMMARY OF THE INVENTION

In accordance with the invention, there is provided an elongated closure member whose length can be cut to spatially accommodate a spliced-joint object that needs to be insulated, sealed, waterproofed and otherwise protected from the elements. The closure member has a main-body wall of heat-shrinkable material that can envelop and wrap-around the object. Such heat-shrinkable material sandwiches therebetween metal channel inserts to form hooks that can be interconnected and assembled as an interlocking joint. When the hooks are interconnected and assembled, the closure member defines and functions as an enveloping tubular member for the object. Upon appropriate application thereto of heat, the material of such closure member shrinks to its original form and thereby shrinks upon the enveloped object to effect positive closure and seal.

BRIEF DESCRIPTION OF THE DRAWINGS

The object of the invention and other objects of the invention should be discerned and appreciated by reference to the drawings, wherein like reference numerals refer to similar parts throughout the several views, in which.

DESCRIPTION OF THE PREFERRED EMBODIMENT

Figure 1:
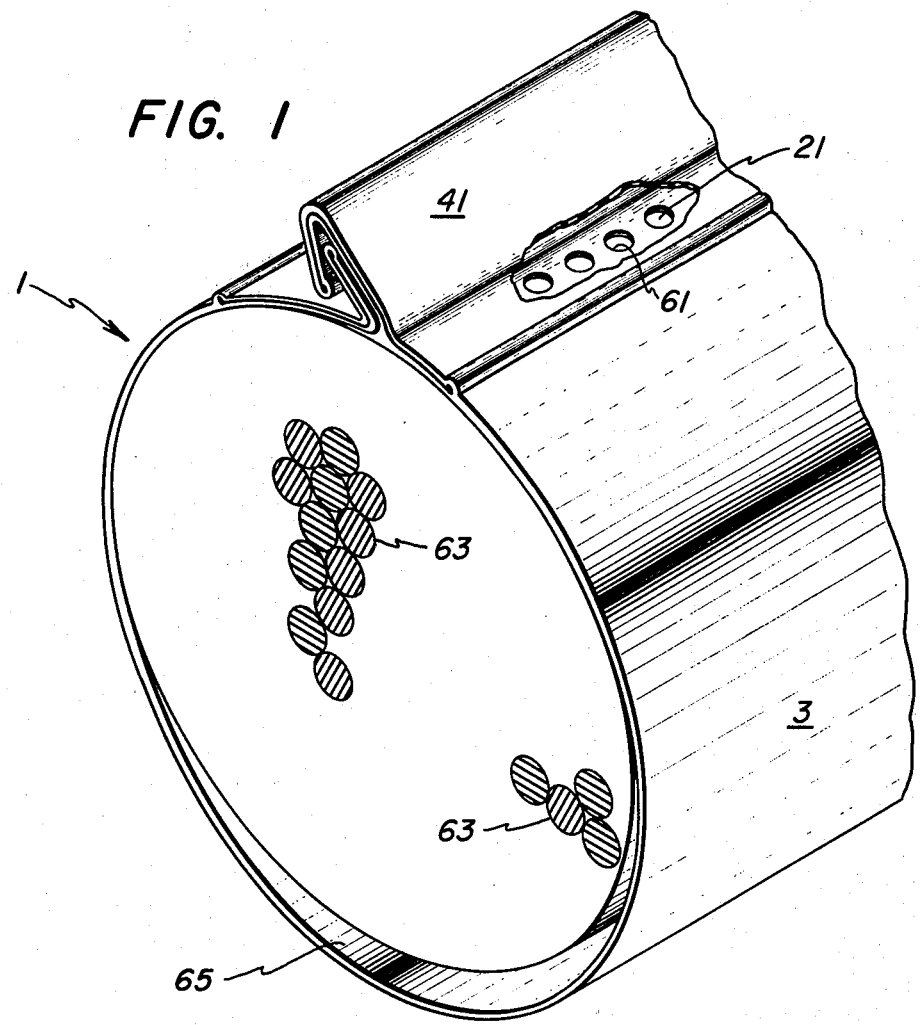
FIG. 1 is an isometric view showing the closure member enveloping an object and with the hooks of such closure member assembled but not interfolded.

In FIG. 1 of the drawings, reference numeral 1 generally refers to the closure member of the invention. Closure member 1 employs material of the heat-shrinkable, heat-unstable or recoverable type, such as polyethylene, butyl rubber, P.V.C., polypropylene, polyurethane and other similar materials having plastics or elastics memory, and can be economically produced by extrusion, molding and other manufacturing processes.

Closure member 1 has a main-body wall 3 of such material which also sandwiches therebetween metal channel inserts 5 and 7 to form corresponding first and second hooks 9 and 11 that can be interconnected and assembled as an interlocking joint. The inserts 5 and 7 are centered within the sandwiching material. Hence, with reference to FIGS. 2-5, each layer of the sandwiching material on each side of the inserts 5 and 7 is one-half the thickness of the main-body wall 3. The inner facing surfaces indicated by reference numerals 13 and 15 are coplanar.

The metal channel insert 5 is rolled upon itself to form beads 17 and 19 at its ends, has a main body 21 and is articulated, as shown, to have an angled upper leg 23, knee 25, and an angled downward and backward lower leg 27. The metal channel insert 7 is rolled upon itself to form beads 29 and 31 at its ends, has a main body 33 and is articulated, as shown, to have an angled leg 35.

Figure 3:
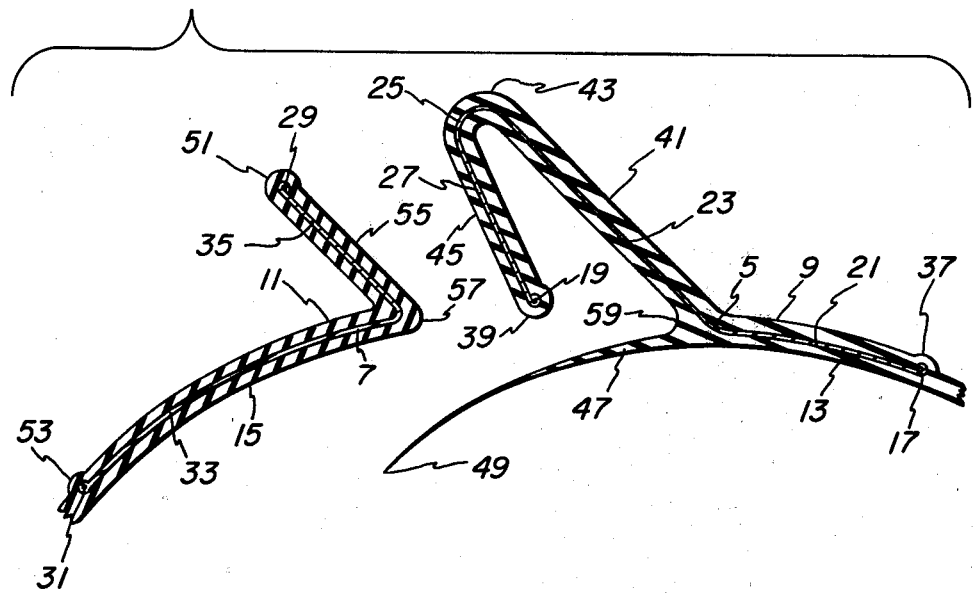
FIG. 3 represents a partial sectional view as same would appear if taken of FIG. 1 of the hooks being assembled.

First hook 9, corresponding in configuration to channel insert 5, has beaded ends 37 and 39, a main body, angled upper leg 41 which has an interior surface, outer knee 43 and lower leg 45. The upper leg 41 and lower leg 45 define an inner knee or corner. The end 39 of hook 9 has a small projection defining a detent. With reference to FIG. 3, is should be noted that the material has a run-out 47 that tapers to a feather edge 49. Second hook 11, corresponding in configuration to channel insert 7, has beaded ends 51 and 53, a main body, and an angled leg 55 which has an interior surface. The leg 55 and main body of the second hook 11 define an inner corner. The end 51 of hook 11 has a small projection defining a detent.

Figure 5:
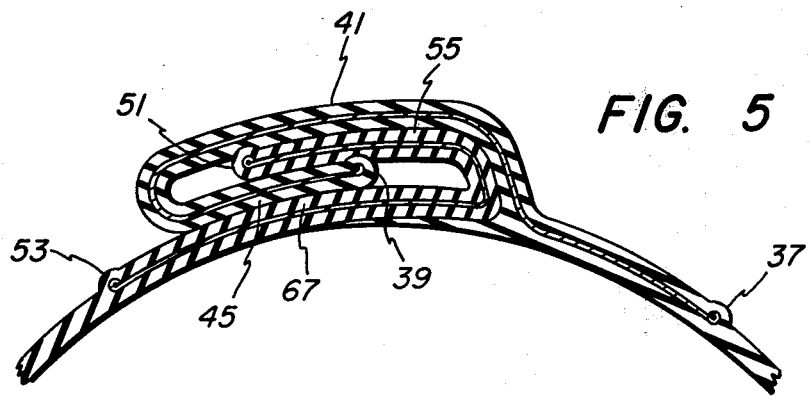
FIG. 5 represents a partial sectional view of the joint as would appear if taken of FIG. 1 with the hooks assembled, interfolded and tapped down.

Such hooks 9 and 11, assembled in interfolded and sandwiched relationship, and tapped down as shown in FIG. 5, constitutes the closure-member joint of this invention. In such assembled closure-member joint, run-out 47 seals such joint by engaging abutment against the common inner facing surface 15. Hook 11 has an outer radius 57 that is complemental with and mates with the inner radius 59 of hook 9.

Main body 21 may have retaining holes 61 whereby the sandwiching material flows therein to provide and effect greater retention of the metal channel insert 5. Although not shown, the main body 33 similarly has retaining holes in metal channel insert 7 for the same purpose. The rolled end beads 17 and 19, and 29 and 31, function to provide further retention of the respective metal channel inserts 5 and 7 within the sandwiching material.

Figure 4:
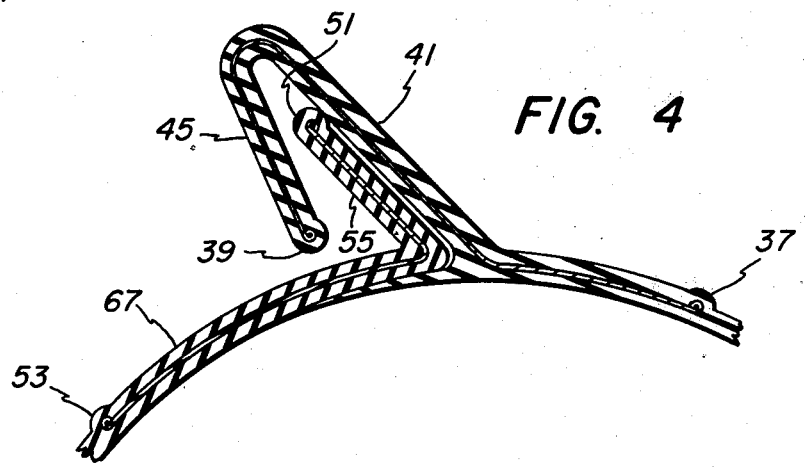
FIG. 4 represents a partial sectional view of the joint would appear if same were taken of FIG. 1.

Referring to FIGS. 1 and 4: if an imaginary vertical line corresponding to a diameter is constructed and drawn through the intersection where indicated radius 57 engages and abuts radius 59, and another imaginary line is drawn through such intersection of radii 57 and 59 normal to such imaginary vertical line, the upper leg will generate an angle of approximately 135 degrees counterclockwise relative to such imaginary horizontal line, the angle of inward incidence of lower leg 45 to such imaginary vertical line will be approximately 20 degrees counterclockwise if such lower leg 45 is extended to intersect such imaginary vertical line, and the angled leg 55 will similarly generate an angle or approximately 135 degrees counterclockwise relative to such imaginary horizontal line. In assembly of the closure-member joint, legs 41 and 55 will be in parallel abutting relationship.

The approximate angles set forth for the hooks 9 and 11 serve to facilitate their assembly in which hook 9 would be grasped, moved and disposed horizontally toward hook 11 such that run-out 47 engages radius 57, lower leg 45 is appropriately manipulated to slide over the beaded end 51 of angled leg 55 to assume the assembly shown in FIG. 4.

Hooks 9 and 11, upon being assembled, interfolded and tapped down to define the joint shown in FIG. 5, transforms closure member 1 into an enveloping tubular member. When such hooks 9 and 11, as shown in FIG. 5, are further deformed, as shown in FIG. 2, the result is the positive inter-locking joint and seal.

Upon appropriate application of heat thereafter, the main-body wall 3 shrinks to its original dimensional form thereby shrinking upon the enveloped object 63 to effect positive closure and seal, and thereby to insulate, seal, waterproof and protect the object 63 from the elements.

Figure 2:
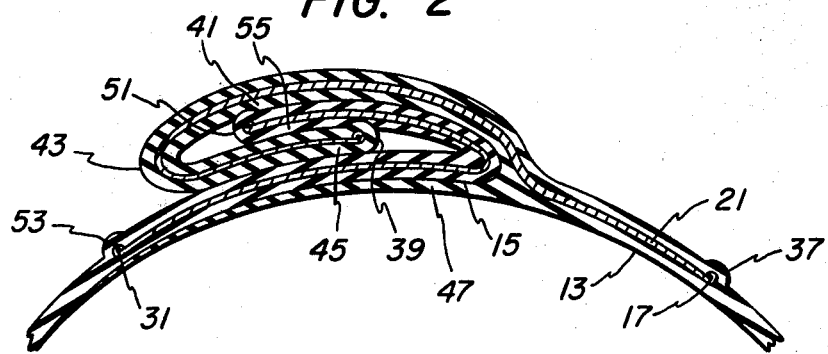
FIG. 2 represents a partial sectional view of the joint as same would appear if taken of FIG. 1 with the hooks assembled, interfolded, tapped down and deformed to result in the positive interlocking joint and seal.

It should be appreciated that not only is a positive seal of the joint provided because the entire length of run-out 47 is in engaged common abutment against the inner facing surface 15, but also positive seal of such joint is further provided by the detent of end 39 imbedded in leg 55 and the detent of end 51 imbedded in leg 41, as shown in FIG. 2.

It should be discerned with reference to FIG. 2 that more positive joint closure and seal results when a circumferential force component is acting to tend to pull-apart the assembled, interfolded, tapped down and deformed joint because such circumferential force component will make the imbedded detents of ends 39 and 51 even more tighter in their imbedments and will thereby result in a tighter and more positive interlocked joint and seal.

Examples of the methods by which heat-recoverable materials can be made are set forth in U.S. Pat. No. 3,899,807, column 3, lines 18–56, which is incorporated herein by reference. Heat-shrinkable material is employed such that upon application thereto of the required and necessary amount of heat to cause the material to shrink and be restored to its original dimensional configuration, such material will shrink and will be restored to its original configuration. Heat to effect such shrinking and restoration of such material is supplied by hot air, radiation, hot fluid, etc. Such required and necessary amount of heat for this type of material is its glass-transition temperature, or above, but below its melting temperature.

Such shrink and restoration of the material enveloping the object 63, such, for example, as a spliced joint, introduces the inwardly acting force of the shrunk and restored enveloping material upon such object 63. This force component is directed radially inward to the object 63 being sealed. A problem in the prior art is the fact that the object 63, subjected to the force(s) from the heat-recoverable closure member 1 undergoing heat shrinking will have reaction force(s) directed outwardly to the heat-recoverable closure member 1. Such outward force(s) from the object acting on the closure member 1 will have a resultant circumferential component of force(s) sufficient to pull-apart the closure-member joint when such circumferential force component exceeds the strength of the closure member joint.

The present invention featuring the co-extruded metal channel inserts 5 and 7 and forming corresponding hooks 9 and 11 for the unique closure-member joint design achieves and effects positive grip along with the unique way that such closure-member joint further interlocks when the closure member 1 undergoes heat shrinking (which may be referred to as the heat-shrinking process). A phenomenon of this invention has already been described in that the simple method of interlocking and assembly of the closure member's joint and seal is not only capable of counteracting and resisting such described circumferential force component during such heat-shrinking process, but also such circumferential force component derived from such heat-shrinking process is utilized and appropriate to make and render the closure-member joint even more positive and tight as explained respecting the imbedded detents of ends 39 and 51, to thereby effect and assure constant joint integrity and reliability of such closure-member joint.

The metal channel inserts 5 and 7 are of suitable thin-guage steel, aluminum, copper, brass or other suitable metal whose thickness ranges from 0.005" to 0.025" depending upon the particular type of metal employed and the necessary size of the closure member 1 for purposes of enclosing the object 63 and providing and imparting strength to the hooks 9 and 11 of the closure-member joint. Since the metal channel inserts 5 and 7 are totally encapsulated in polymeric, heat-shrinkable material to form and define the hooks 9 and 11, such encapsulating material so employed provides for weather and corrosion resistance to such inserts to assure long life and thereby long-term performance and integrity for the closure-member joint.

The heat-shrinkable material sandwiching therebetween the metal channel inserts 5 and 7 is of sufficient thickness and cooperates with inserts 5 and 7 to impart strength and structural rigidity to the formed and defined hooks 9 and 11 to maintain hooks 9 and 11 in their configurations while at the same time obviating any sharp edges from any of the metal channel inserts, and further providing and effecting a better sealing result from such plastic material. The thickness of such main-body wall 3 ranges from 0.030" to 0.090", or thicker, depending upon the size of the wrap-around diameter of closure member 1. After such closure member 1 has been extruded, molded, or formed by other manufacturing processes, then such closure member 1 is expanded in-line or off-line to a resultant thickness of 0.030" to 0.090". Such closure member 1 can be cross-linked chemically or by irradiation in-line, or off-line with extrusion or other suitable manufacturing means along with stretching and expansion processes. The entire inner facing surface 65 of the closure member 1 that contacts the object 63 being sealed, in addition to the indicated facing surfaces 13 and 15, may be coated with electrical sealant, such as mastic or other suitable flowable sealant. However, such coating sealant is not absolutely necessary. In the event flowable sealant is employed, the closure member 1 can be coated with such sealant in-line with the manufacturing of the closure member 1 of the invention or can be co-extruded with such sealant, or the closure member 1 can be coated off-line with such sealant.

This invention structurally incorporates and carries with it a latitude of manufacturing tolerances and concomitant ease of application while achieving and effecting positive seal of the object 63, such as a spliced joint, after field installation of the closure member 1 therearound.

The metal channel inserts 5 and 7 for the hooks 9 and 11 or the interlocking grip of the closure-member joint can be produced by a roll-forming process or other suitable process. Such roll-forming can be effected in-line or off-line with co-extrusion, molding or other suitable manufacturing means, such as post-assembling with heat-shrinkable polymeric sheet, tubuing or other suitable profile in the course of manufacturing the closure member 1 of this invention.

The invention integrates the structural features and functional attributes of its unique joint design having flexible closure into the closure member 1 to provide a closure member 1 of integral, one-piece construction which provides ease of handling and installation, as well as long-term performance reliability. The hooks 9 and 11 are suitably angled and articulated to facilitate their assembly in the field by hand and with completion of the joint similarly effected by hand (i.e., after the previously described procedure has been followed to effect by hand the partial assembly shown in FIG. 4, the human operator applies sufficient manipulative pressure to and downwardly upon the angled upper leg 41 so that lower leg 45 will tuck under and interpose itself in abutting relationship between and against angled leg 55 and the upper layer 67 of the material that sandwiches the main body 33 of channel insert 7), or by simply using a hammer or other suitable object to tap down upper leg 41 to achieve the same result followed by sufficient hammer tapping to effect the result represented by FIG. 5 with imbedment of detents of ends 39 and 51—in contrast to the burdensome and complex needs of the prior art of employing and using heavy and expensive installation equipment.

This invention virtually eliminates the problem of equipment and application variables in the field. This invention also eliminates irradiation cross-linking variables as a product of this invention works in any degree of cross-linking, so long as the retained dimensions of the closure member 1 after expanding and cross-linking continues to provide sufficient wrap-around. This invention provides a closure-member joint design that works whether or not fusion or non-fusion occurs inbetween the interfolded hooks 9 and 11. Therefore, cross-linking or non cross-linking of the heat recoverable material at the closure-member joint area does not affect the purpose and performance of the present invention. This beneficial attribute is in stark contrast to some other prior-art inventions that require non cross-linking for fusion at the joint (see, U.S. Pat. No. 3,542,077) or differential stretching or cross-linking (see, U.S. Pat. No. 3,899,807) to effect and produce the closure members's joint.

The closure member 1 of this invention, with its joint design for effecting positive closure and seal, may also be employed as a protective covering as a splicing insulation of one branch or splicing insulations of multiple branches of pipes, cables or similar articles.

Under "2. Background Art", the functional attributes of this invention in comparison to the prior art were set forth. It is submitted that the reasons have been set forth herein why the closure-member joint of this invention need not be bonded together.

The reasons why discrete sealing interlock of the closure-member joint is not essential is that space is provided between legs 41, 45 and 55 for interlocking freedom, as shown in FIG. 4, and the interlocking joint design functions regardless of the location of the detents of the ends 39 and 51 so long as such detents of the ends 39 and 51 overlap, as shown in FIGS. 2 and 5.

The fact that the closure member 1 is of integral, one-piece construction has already been explained and set forth in detail.

Wide range of alignment in the closure-member joint is possible because joint alignment is not critical because the interlocking joint design functions regardless of the location of the detents of the ends 39 and 51 so long as such detents of such ends 39 and 51 overlap, as shown in FIGS. 2 and 5. Therefore, with reference to FIGS. 2 and 5, it can be seen that about half the dimensional lengths of legs 45 and 55 remain and such remainders provide freedom for any misalignment of the closure-member joint but the joint will still function because the detents of the ends 39 and 51 will still remain in overlapped relationship to each other.

Because the closure-member joint mechanically functions independently as interlocking joint for reasons of its detailed and described mechanical structural features, cross-linking or non cross-linking of the encapsulating material at the joint is not essential nor critical, nor is any degree of stretching or non-stretching. In other words, the closure-member joint in the present invention is designed to work as an interlocking joint from non cross-linking to any degree of cross-linking and from non-stretching to any degree of stretching of the encapsulating polymeric material at the joint.

An effective and positive functioning seal at the closure-member joint does not depend upon simultaneous and compatible application of heat, time and pressure to obtain bonding of the material at the joint because effective and positive joint sealing is provided mechanically by either one or both of the run-out 47 throughout its length, and by the detents of the end 39 imbedded in leg 55 and by the detent of the end 51 imbedded in leg 41.

Simple field installation of the closure member can be effected regardless of the weather because the closure member of this invention does not use an adhesive for its joint, nor is bonding required at such joint.

The sealing of the closure-member joint does not depend upon the use of a separate adhesive because no adhesive is employed.

Joint contamination will not cause malfunction of the interlocking joint because this closure member invention does not use an adhesive and does not require bonding at its joint.

The closure member invention possesses the functional attribute of being easily manufactured because the present invention of integral, one-piece construction can be produced by in-line process of roll-forming the metal channel inserts, co-extrusion of the closure member and its joint, cross-linking, and stretching and cut to length. The subprocesses of metal roll-forming, cross-linking by irradiation, and stretching can also be off-line with co-extrusion for all or part of such subprocesses. No further bonding, slitting, or other secondary operations are needed in the present invention.

No additional heavy equipment or tool(s) are necessary to effect field installation of the closure member because field installation of the closure member can be done by hand and with the joint interlocked by optional use of a hammer for tapping the hooks of the joint together.

As used and defined in the claims:

Positive mechanical closure and seal of the joint means the detent of the end 39 of hook 9 imbedded in the interior surface of leg 55 of hook 11 and the detent of the end 51 of hook 11 imbedded in the interior surface of upper leg 41 of hook 9.

Positive mechanical seal and closure of the joint also means, where otherwise specifically set forth in the claims, the engaged abutment of the run-out 47 against the inner facing surface 15 of the main body of the second hook 11.

First assembly range or "window" of detent imbedment in said second hook within which range of detent imbedment in said second hook said joint can be misaligned without loss of joint integrity means the range afforded beween the inner corner defined by upper leg 41 and lower leg 45 of the first hook 9, and the detent imbedment of the detent of the end 39 of the first hook 9 in the interior surface of leg 55 of the second hook 11.

Second assembly range or "window" of detent imbedment in said first hook within which range of detent imbedment in said first hook said joint can be misaligned without loss of joint integrity means the range afforded between the inner corner defined by the leg 55 and main body of the second hook 11, and the detent imbedment of the detent of the end 51 of the second hook 11 in the interior surface of leg 41 of the first hook 9.

Having thusly described my invention, I claim:

1. A closure member insulating, sealing, waterproofing and otherwise protecting an object from the elements; said closure member being of integral, one-piece construction, said closure member being of synthetic resinous heat recoverable material, said closure member having a main-body wall enveloping and wrapping-around said object, said main-body wall having two hooks interconnected and assembled as a mechanical interlocked joint effecting positive mechanical closure and seal of said joint without depending upon fusion for joint integrity, each of said hooks having a metal insert imbedded therein having the configuration of its respective hook, said joint forming with said main-body wall an enveloping tubular member, said hooks having ends, said ends of said hooks having small projections defining detents, said two hooks being a first hook and a second hook, said first hook having a main body, upper leg, knee and lower leg, said upper leg of said first hook having an interior surface, said second hook having a main body and leg, said leg of said second hook having an interior surface; in assembly: said leg of said second hook being mechanically interposed, interfolded and sandwiched between said upper and lower legs of said first hook, said lower leg of said first hook being mechanically interposed, interfolded and sandwiched between said leg of said second hook and said main body of said second hook, said detent of said second hook being mechanically imbedded in said interior surface of said upper leg of said first hook, said detent of said first hook being mechanically imbedded in said interior surface of said leg of said second hook, said upper leg and said lower leg of said first hook defining a corner, said leg and main body of said second hook defining a corner, said corner of said first hook, and said detent of said first hook imbedded in said leg of said second hook, defining and affording a first assembly range or "window" of detent imbedment in said second hook within which range of detent imbedment in said second hook said joint can be misaligned without loss or joint integrity, said corner of said second hook, and said detent of said second hook imbedded in said upper leg of said first hook, defining and affording a second assembly range or "window" of detent imbedment in said first hook within which range of detent imbedment in said first hook said joint can be misaligned without loss of joint integrity; joint integrity being said detent of said first hook remaining sandwiched between said leg and main body of said second hook with said detent of said first hook imbedded in said leg of said second hook, and said detent of said second hook remaining sandwiched between said upper leg and lower leg of said first hook with said detent of said second hook imbedded in said upper leg of said first hook; and said joint retaining its said joint integrity so long as said detent of said first hook remains sandwiched between said leg and main body of said second hook and said detent of said first hook remains imbedded in said leg of said second hook, and so long as said detent of said second hook remains sandwiched between said upper leg and lower leg of said first hook and said detent of said second hook remains imbedded in said upper leg of said first hook, and such mechanical imbedments of said detents with said respective hooks effecting such positive mechanical closure and seal of said joint.

2. A closure member in accordance with claim 1, wherein said hooks are suitably angled and articulated to facilitate their field assembly by hand.

3. A closure member in accordance with claim 1, wherein said closure member has a run-out of said material and said main body of said second hook has an inner facing surface, and wherein, upon assembly of said hooks, said run-out effects positive mechanical seal and closure of said joint by engaged abutment of said run-out against said inner facing surface of said main body of said second hook.

4. A closure member in accordance with claim 1, wherein said material sandwiches therebetween said inserts to form and define said hooks.

5. A closure member in accordance with claim 1, wherein prior to recovery said upper leg of said first hook is angled upwardly, and wherein said lower leg of said first hook is angled downwardly and backwardly.

6. A closure member in accordance with claim 1, wherein prior to recovery said upper leg of said second hook is angled upwardly.

7. A closure member in accordance with claim 1, wherein prior to recovery said upper leg of said first hook is angled upwardly, wherein said lower leg of said first hook is angled downwardly and backwardly, and wherein said upper leg of said second hook is angled upwardly.

8. A closure member in accordance with claim 2, wherein said closure member has a run-out of said material and said main body of said second hook has an inner facing surface, and wherein, upon assembly of said hooks, said run-out effects positive mechanical closure and seal of said joint by engaged abutment of said run-out against said inner facing surface of said main body of said second hook.

9. A closure member in accordance with claim 2, wherein said material sandwiches therebetween said inserts to define said hooks.

10. A closure member in accordance with claim 1, wherein said material sandwiches therebetween said inserts to form and define said hooks, wherein said hooks are suitably angled and articulated to facilitate their field assembly by hand, wherein said upper leg of said firt hook is angled upwardly, wherein said lower leg of said first hook is angled downwardly and backwardly, wherein said upper leg of said second hook is angled upwardly, wherein said closure member has a run-out of said material and said main body of said second hook has an inner facing surface, and wherein, upon assembly of said hooks, said run-out effects positive mechanical closure and seal of said joint by engaged abutment of said runout against said inner facing surface of said main body of said second hook.

* * * * *